(12) United States Patent
Kita et al.

(10) Patent No.: US 11,326,817 B2
(45) Date of Patent: May 10, 2022

(54) ICE MAKING SYSTEM WITH CONTROLLED DRYNESS OF REFRIGERANT

(71) Applicant: DAIKIN INDUSTRIES, LTD., Osaka (JP)

(72) Inventors: Kouichi Kita, Osaka (JP); Azuma Kondou, Osaka (JP); Shouhei Yasuda, Osaka (JP); Keisuke Nakatsuka, Osaka (JP); Kazuyoshi Nomura, Osaka (JP); Takeo Ueno, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/962,052

(22) PCT Filed: Dec. 14, 2018

(86) PCT No.: PCT/JP2018/046062
§ 371 (c)(1),
(2) Date: Jul. 14, 2020

(87) PCT Pub. No.: WO2019/138780
PCT Pub. Date: Jul. 18, 2019

(65) Prior Publication Data
US 2020/0348058 A1 Nov. 5, 2020

(30) Foreign Application Priority Data

Jan. 15, 2018 (JP) .............................. JP2018-003948

(51) Int. Cl.
*F25B 49/02* (2006.01)
*F25B 41/31* (2021.01)
(Continued)

(52) U.S. Cl.
CPC .............. *F25B 41/31* (2021.01); *F25B 39/00* (2013.01); *F25B 49/027* (2013.01); *F25B 39/02* (2013.01);
(Continued)

(58) Field of Classification Search
CPC ...... F25C 2600/04; F25B 39/00; F25B 39/02; F25B 49/027; F25B 2600/04; F25B 2600/21; F25B 2600/2513
See application file for complete search history.

(56) References Cited

U.S. PATENT DOCUMENTS 2,585,021 A * 2/1952 Lessard ................... F25C 1/142
62/71
2011/0083456 A1* 4/2011 Wakamoto .............. F25B 41/00
62/115

FOREIGN PATENT DOCUMENTS

EP 2317250 A1 5/2011
JP H01-256760 A 10/1989
(Continued)

OTHER PUBLICATIONS

FR 2737283 (English translation) (Year: 1995).*
(Continued)

*Primary Examiner* — Jonathan Bradford
(74) *Attorney, Agent, or Firm* — Osha Bergman Watanabe & Burton LLP (57) ABSTRACT

An ice making system includes: a refrigerant circuit that performs a vapor compression refrigeration cycle and that includes a compressor, a condenser that condenses refrigerant discharged from the compressor, a first expansion valve with an adjustable opening degree that decompresses the refrigerant from the condenser, a flooded evaporator that evaporates the refrigerant decompressed by the first expansion valve, and a superheater that imparts a degree of superheating to the refrigerant discharged from the flooded (Continued)

evaporator; a circulation circuit that circulates a medium that is cooled by the flooded evaporator; and a control device that controls the adjustable opening degree of the first expansion valve such that the superheater imparts to the refrigerant discharged from the flooded evaporator a degree of superheating at which dryness of the refrigerant is kept within a predetermined range of less than 1.

5 Claims, 5 Drawing Sheets (51) Int. Cl.
*F25B 39/00* (2006.01)
*F25B 39/02* (2006.01)
*F25C 1/147* (2018.01)

(52) U.S. Cl.
CPC ... *F25B 2600/21* (2013.01); *F25B 2600/2513* (2013.01); *F25C 1/147* (2013.01); *F25C 2600/04* (2013.01)

(56) References Cited

FOREIGN PATENT DOCUMENTS

| JP | H05-045011 A | 2/1993 |
| JP | H10-141822 A | 5/1998 |
| JP | 2003-042611 A | 2/2003 |
| JP | 2009-162388 A | 7/2009 |
| JP | 2009-276002 A | 11/2009 |
| KR | 10-2013-0027289 A | 3/2013 |

OTHER PUBLICATIONS

International Preliminary Report on Patentability issued in corresponding International Application No. PCT/JP2018/046062 dated Jul. 21, 2020 (9 pages).
International Search Report issued in corresponding International Application No. PCT/JP2018/046062 dated Feb. 12, 2019 (5 pages).
Extended European Search Report issued in corresponding European Application No. 18899517.9 dated Feb. 16, 2021 (8 pages).

\* cited by examiner

ICE MAKING SYSTEM WITH CONTROLLED DRYNESS OF REFRIGERANT

TECHNICAL FIELD

The present invention relates to an ice making system.

BACKGROUND

Patent Literature 1 discloses a refrigeration apparatus including a flooded evaporator having a plurality of flow pipes and a container housing the flow pipes. A medium to be cooled such as water and brine flows through the flow pipes. This refrigeration apparatus expands, with an expansion mechanism, high-pressure liquid refrigerant flowing out of a condenser to reduce the pressure of the refrigerant, supplies the low-pressure liquid refrigerant into the container of the flooded evaporator, and immerses the flow pipes inside the container in the low-pressure liquid refrigerant. As a result, the medium to be cooled flowing through the flow pipes is cooled, while the liquid refrigerant in the container evaporates. The low-pressure refrigerant that has evaporated is discharged from an upper part of the flooded evaporator and returned to a suction side of a compressor.

This type of flooded evaporator effectively exhibits the cooling capacity by immersing the flow pipes inside the container in the liquid refrigerant. For that purpose, the flooded evaporator of Patent Literature 1 includes a float switch that detects the level of the liquid refrigerant inside the container. When the float switch detects that the level of the liquid refrigerant inside the container is lower than a predetermined level, the high-pressure liquid refrigerant flowing out of the condenser is bypassed and supplied into the container, whereby the level of the liquid refrigerant inside the container is maintained.

The refrigeration apparatus described in Patent Literature 1 further includes an accumulator between the flooded evaporator and the suction side of the compressor. In general, the accumulator separates the refrigerant discharged from the container of the flooded evaporator into a gas phase and a liquid phase, and causes the compressor to suck only the gas phase. The flooded evaporator of Patent Literature 1 requires the accumulator described above because the level of the liquid refrigerant inside the container is maintained high and the refrigerant discharged from the container becomes wet vapor.

PATENT LITERATURE

Patent Literature 1: Japanese Unexamined Patent Publication No. 1-256760

The refrigeration apparatus described in Patent Literature 1 requires the float switch in order to maintain a predetermined level of the liquid refrigerant inside the container of the flooded evaporator. The refrigeration apparatus described in Patent Literature 1 also requires the accumulator in order to suppress the flow of the liquid refrigerant into the compressor. In particular, the flooded evaporator has a relatively large amount of refrigerant and, accordingly, the accumulator also becomes large. Therefore, the refrigeration apparatus of Patent Literature 1 causes an increase in equipment cost.

SUMMARY

One or more embodiments of the present invention provide an ice making system that can reduce the equipment cost.

(1) An ice making system according to one or more embodiments of the present invention includes:

a refrigerant circuit that performs a vapor compression refrigeration cycle, the refrigerant circuit including a compressor, a condenser that condenses refrigerant discharged from the compressor, a first expansion valve with an adjustable opening degree that decompresses the refrigerant from the condenser, a flooded evaporator that evaporates the refrigerant decompressed by the first expansion valve, and a superheater that imparts a degree of superheating to the refrigerant (i.e., superheats the refrigerant) discharged from the flooded evaporator;

a circulation circuit that circulates a medium to be cooled, which is cooled by the flooded evaporator; and a control device that controls the first expansion valve (i.e., controls or adjusts the opening degree of the first expansion valve) such that the superheater imparts, to the refrigerant discharged from the flooded evaporator, a degree of superheating (i.e., superheats the refrigerant discharged from the flooded evaporator to a superheating temperature) at which dryness of the refrigerant is kept within a predetermined range of less than 1.

With the above configuration, even when the refrigerant inside the flooded evaporator is maintained at a predetermined level to secure the cooling capacity of the flooded evaporator, it is possible to suppress the liquid refrigerant being sucked into the compressor. Therefore, a float switch and a large accumulator that have conventionally been provided are no longer necessary, and the equipment cost can be reduced.

(2) According to one or more embodiments, the predetermined range of the dryness is 0.9 or more and 0.95 or less (i.e., between 0.9 and 0.95).

With this configuration, the liquid level inside the flooded evaporator can be appropriately maintained.

(3) The superheater may superheat the refrigerant discharged from the flooded evaporator using refrigerant that has flowed out of the condenser, and the control device may set a target value of the degree of superheating (i.e., target value of the superheating temperature) in accordance with a temperature of the refrigerant that has flowed out of the condenser.

According to this configuration, the capacity of the superheater varies depending on the temperature of the refrigerant that has flowed out of the condenser; therefore, if the degree of superheating imparted to the refrigerant by the superheater is constant, the dryness of the refrigerant discharged from the flooded evaporator may be out of a predetermined range. Therefore, a target value of the degree of superheating is set in accordance with the temperature of the refrigerant that has flowed out of the condenser. This makes it possible to keep the dryness of the refrigerant discharged from the flooded evaporator within a predetermined range.

(4) According to one or more embodiments, the ice making system further includes a subcooling device (i.e., refrigerant cooler) that subcools the refrigerant that has flowed out of the condenser, wherein the superheater superheats the refrigerant discharged from the flooded evaporator using the refrigerant subcooled by the subcooling device, and the control device controls a capacity of the subcooling device such that a temperature of the refrigerant subcooled by the subcooling device is maintained constant.

According to this configuration, the temperature of the refrigerant that has flowed out of the subcooler is maintained constant, making it possible to suppress the fluctuation of the capacity of the superheater. It is therefore possible to keep the dryness of the refrigerant discharged from the flooded evaporator within a predetermined range by controlling the first expansion valve so as to impart a constant degree of superheating.

(5) According to one or more embodiments, the subcooling device includes:

a subcooler into which the refrigerant flows from the condenser;

a branch pipe that branches from a refrigerant path that extends from the subcooler to the first expansion valve; and a second expansion valve that decompresses the refrigerant flowing through the branch pipe, the subcooling device subcools the refrigerant flowing from the condenser into the subcooler using the refrigerant decompressed by the second expansion valve, and the control device controls the second expansion valve such that a temperature of the refrigerant that has flowed out of the subcooler reaches a constant target value.

According to this configuration, controlling the second expansion valve by the control device makes it possible to maintain the temperature of the refrigerant that has flowed out of the subcooler constant, and to suppress the fluctuation of the capacity of the superheater.

(6) According to one or more embodiments, the ice making system further includes a fan that cools the condenser with air, a number of rotations of the fan being controlled by the control device, and the control device controls a capacity of at least one of the subcooling device and the fan such that a circulation amount of the refrigerant passing through the first expansion valve is constant.

If the circulation amount of the refrigerant passing through the first expansion valve fluctuates, the liquid level inside the flooded evaporator becomes unstable, which may lead to a decrease in efficiency of heat exchange and insufficient lubrication of the compressor. Meanwhile, the circulation amount of the refrigerant passing through the first expansion valve is affected by the temperature and pressure (high pressure) of the refrigerant flowing into the first expansion valve. The above configuration thus makes it possible to keep the circulation amount of the refrigerant passing through the first expansion valve constant and to suppress the fluctuation of the level of the refrigerant inside the flooded evaporator, by controlling the capacity of at least one of the subcooling device that can adjust the temperature of the refrigerant flowing into the first expansion valve and the fan that can adjust the pressure of the refrigerant.

(7) According to one or more embodiments, the medium to be cooled is seawater.

DETAILED DESCRIPTION

Embodiments of an ice making system will be described in detail below with reference to the accompanying drawings. Note that the present disclosure is not limited to the following examples, but is indicated by the appended claims and is intended to include all modifications within the scope and meaning equivalent to those of the claims.

(Overall Configuration of Ice Making System)

Figure 1:
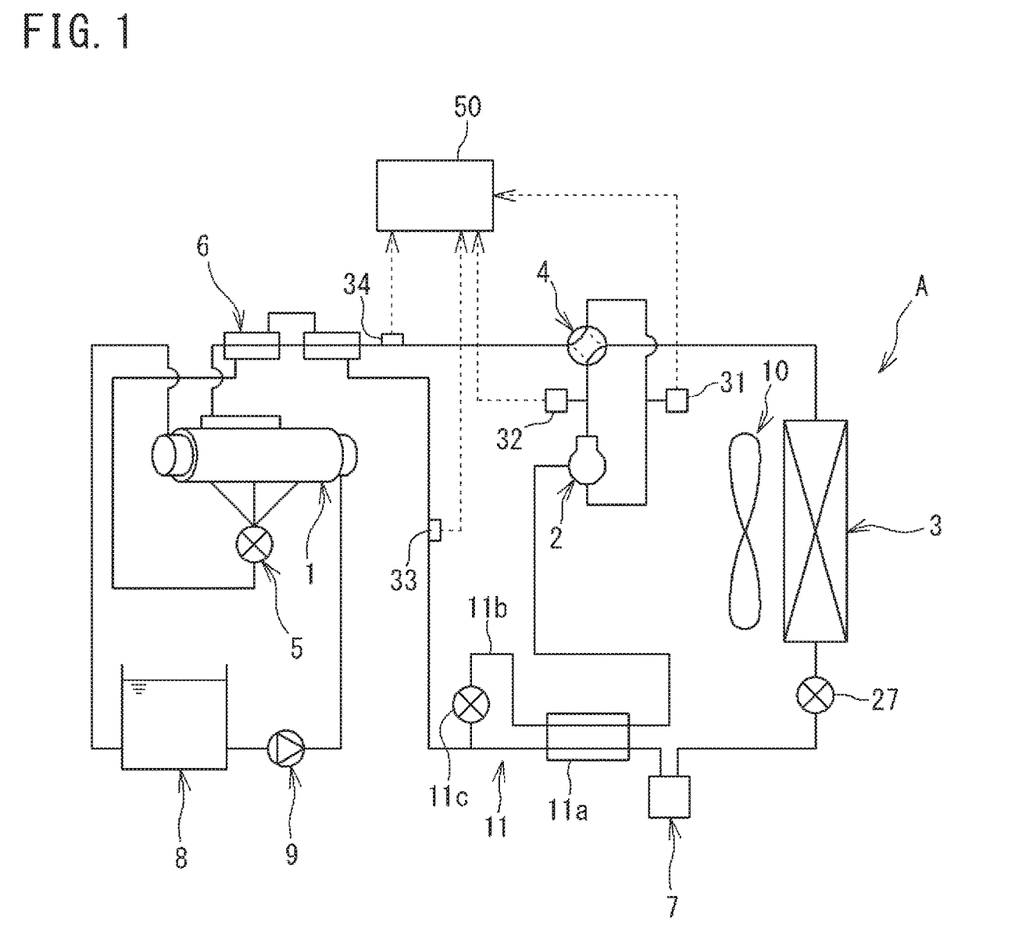
FIG. 1 is a schematic configuration diagram of an ice making system according to one or more embodiments.

FIG. 1 is a schematic configuration diagram of an ice making system according to one or more embodiments.

In the ice making system A of one or more embodiments, an ice making machine 1 continuously generates ice slurry using, as a raw material, seawater stored in a seawater tank 8 and returns the generated ice slurry to the seawater tank 8. The ice making machine 1 according to one or more embodiments is also called an ice generator. The ice making machine 1 according to one or more embodiments is configured by, for example, a double-pipe ice making machine.

The ice slurry refers to sherbet-like ice in which fine ice is mixed with water or an aqueous solution. The ice slurry is also referred to as slurry ice, slush ice, or liquid ice.

The ice making system A according to one or more embodiments can continuously generate seawater-based ice slurry. Therefore, the ice making system A according to one or more embodiments is installed in, for example, a fishing boat or a fishing port, and the ice slurry returned to the seawater tank 8 is used for keeping fresh fish cool.

The ice making system A uses seawater as a medium to be cooled (object to be cooled). The ice making system A includes the ice making machine 1 as a utilization-side heat exchanger, a compressor 2, a heat source-side heat exchanger 3, a four-way switching valve 4, a utilization-side expansion valve (first expansion valve) 5, a superheater 6, a receiver 7, a subcooling device 11, a heat source-side expansion valve 27, a fan 10, the seawater tank 8, a pump 9, and the like.

The ice making machine 1, the compressor 2, the heat source-side heat exchanger 3, the four-way switching valve 4, the utilization-side expansion valve 5, the superheater 6, the receiver 7, the heat source-side expansion valve 27, and the subcooling device 11 are connected by a refrigerant pipe to constitute a refrigerant circuit. The ice making machine 1, the seawater tank 8, and the pump 9 are connected by a seawater pipe to constitute a circulation circuit.

The compressor 2 compresses the refrigerant and circulates the refrigerant in the refrigerant circuit. The compressor 2 is of a variable displacement type (variable capacity type), and can change the number of rotations of a built-in motor stepwise or continuously by controlling the motor with an inverter. The fan 10 is for cooling the heat source-side heat exchanger 3 with air, and includes a motor, the number of rotations of which is changed stepwise or continuously through inverter control.

The four-way switching valve 4 switches the direction of flowing refrigerant discharged from the compressor 2, that is, supplies the refrigerant either toward the heat source-side heat exchanger 3 or the ice making machine 1. The utilization-side expansion valve 5 and the heat source-side expansion valve 27 are each configured by, for example, an electronic expansion valve that is driven by a pulse motor, and have an adjustable opening degree. The superheater 6 superheats the refrigerant discharged from the ice making machine 1. For example, the superheater 6 is configured by a double-pipe heat exchanger. The superheater 6 superheats the refrigerant discharged from the ice making machine 1 using refrigerant that has flowed out of the heat source-side heat exchanger 3 and passed through the subcooling device 11. In one or more embodiments, two superheaters 6 are connected in series or in parallel.

The subcooling device 11 subcools the refrigerant that has flowed out of the heat source-side heat exchanger 3. More specifically, the subcooling device 11 includes a subcooler 11a, an injection pipe (branch pipe) 11b branched from a refrigerant pipe downstream of the subcooler 11a, and an intermediate expansion valve (second expansion valve) 11c provided in the injection pipe 11b. The subcooler 11a is configured by, for example, a double-pipe heat exchanger. The injection pipe 11b is connected to an intermediate port of the compressor 2. Refrigerant is introduced into a compression chamber during compression through the intermediate port of the compressor 2. For example, a pulse motor-driven electronic expansion valve is used as the intermediate expansion valve 11c. The intermediate expansion valve 11c adjusts the flow rate of the refrigerant flowing through the injection pipe 11b, decompresses the refrigerant, and lowers the temperature of the refrigerant.

The subcooling device 11 subcools the refrigerant that has flowed out of the heat source-side heat exchanger 3 and flowed into the subcooler 11a using the refrigerant (subcooling refrigerant) that has flowed through the injection pipe 11b and has been decompressed by the intermediate expansion valve 11c.

Figure 2:
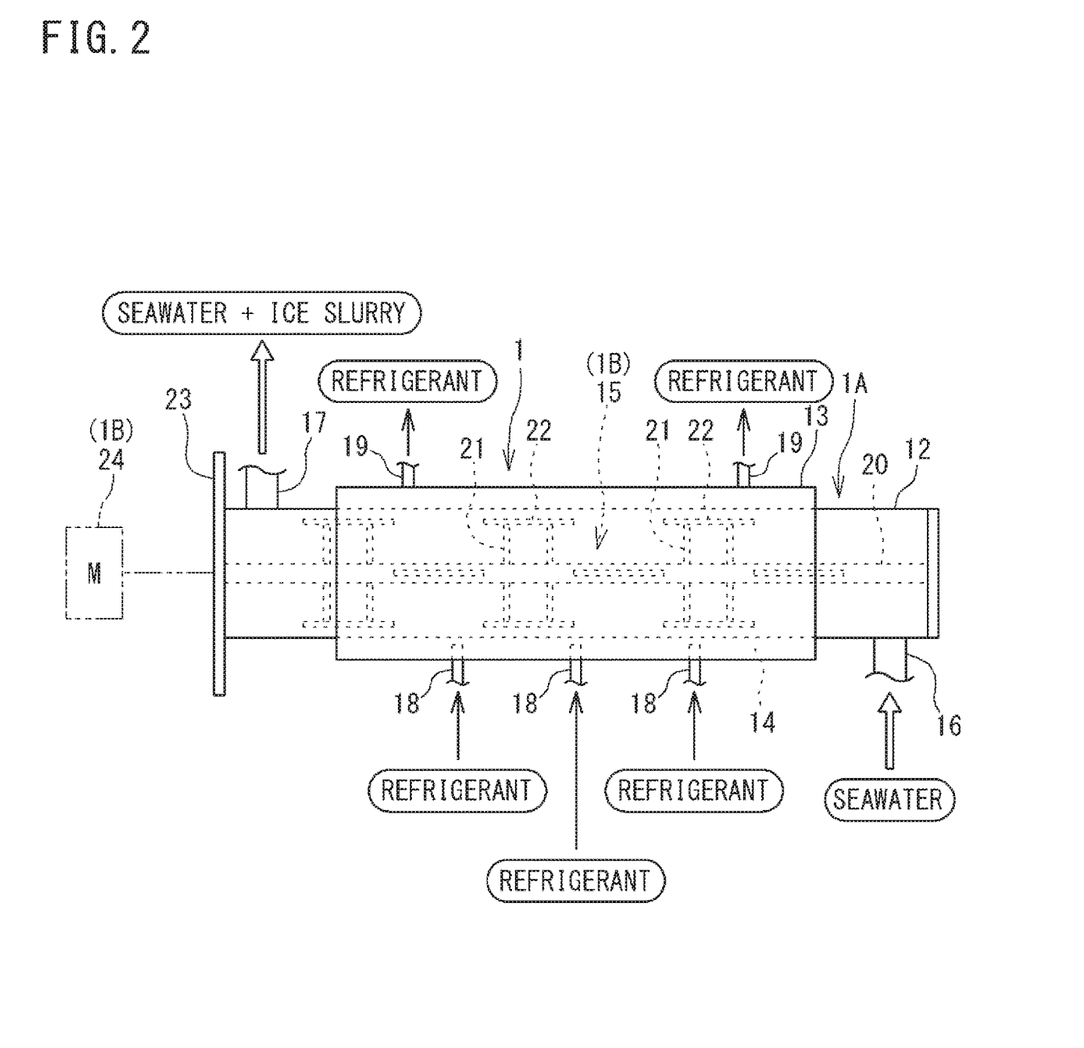
FIG. 2 is an explanatory side view of an ice making machine.

FIG. 2 is an explanatory side view of the ice making machine.

The ice making machine 1 is configured by a double-pipe ice making machine. The double-pipe ice making machine 1 includes an evaporator 1A and a dispersion device 1B. The evaporator 1A includes an inner pipe 12 and an outer pipe 13 each formed in a cylindrical shape. The evaporator 1A is installed horizontally, and thus the axes of the inner pipe 12 and the outer pipe 13 extend horizontally.

The inner pipe 12 is an element through which seawater as a medium to be cooled passes. The inner pipe 12 is formed of a metal material. Both ends of the inner pipe 12 in the axial direction are closed. A blade mechanism 15 constituting the dispersion device 1B is installed inside the inner pipe 12. A drive unit 24 constituting the dispersion device 1B is installed at one end of the inner pipe 12 in the axial direction (left side in FIG. 2). The dispersion device 1B scrapes up the sherbet-like slurry ice generated on the inner peripheral surface of the inner pipe 12 and disperses the ice inside the inner pipe 12.

A seawater inlet 16 is provided at the other end of the inner pipe 12 in the axial direction (right side in FIG. 2). Seawater is supplied into the inner pipe 12 through the seawater inlet 16. A seawater outlet 17 is provided at the one end of the inner pipe 12 in the axial direction. The seawater in the inner pipe 12 is discharged through the seawater outlet 17.

The outer pipe 13 is provided coaxially with the inner pipe 12 on the radially outer side of the inner pipe 12. The outer pipe 13 is formed of a metal material. A plurality of (in the embodiments shown in FIG. 2, three) refrigerant inlets 18 is provided at a lower part of the outer pipe 13. A plurality of (in the embodiment shown in FIG. 2, two) refrigerant outlets 19 is provided at an upper part of the outer pipe 13. Refrigerant that exchanges heat with seawater flows into an annular space 14 between the inner peripheral surface of the outer pipe 13 and the outer peripheral surface of the inner pipe 12. The refrigerant supplied through the refrigerant inlet 18 passes through the annular space 14 and is discharged through the refrigerant outlet 19.

Figure 3:
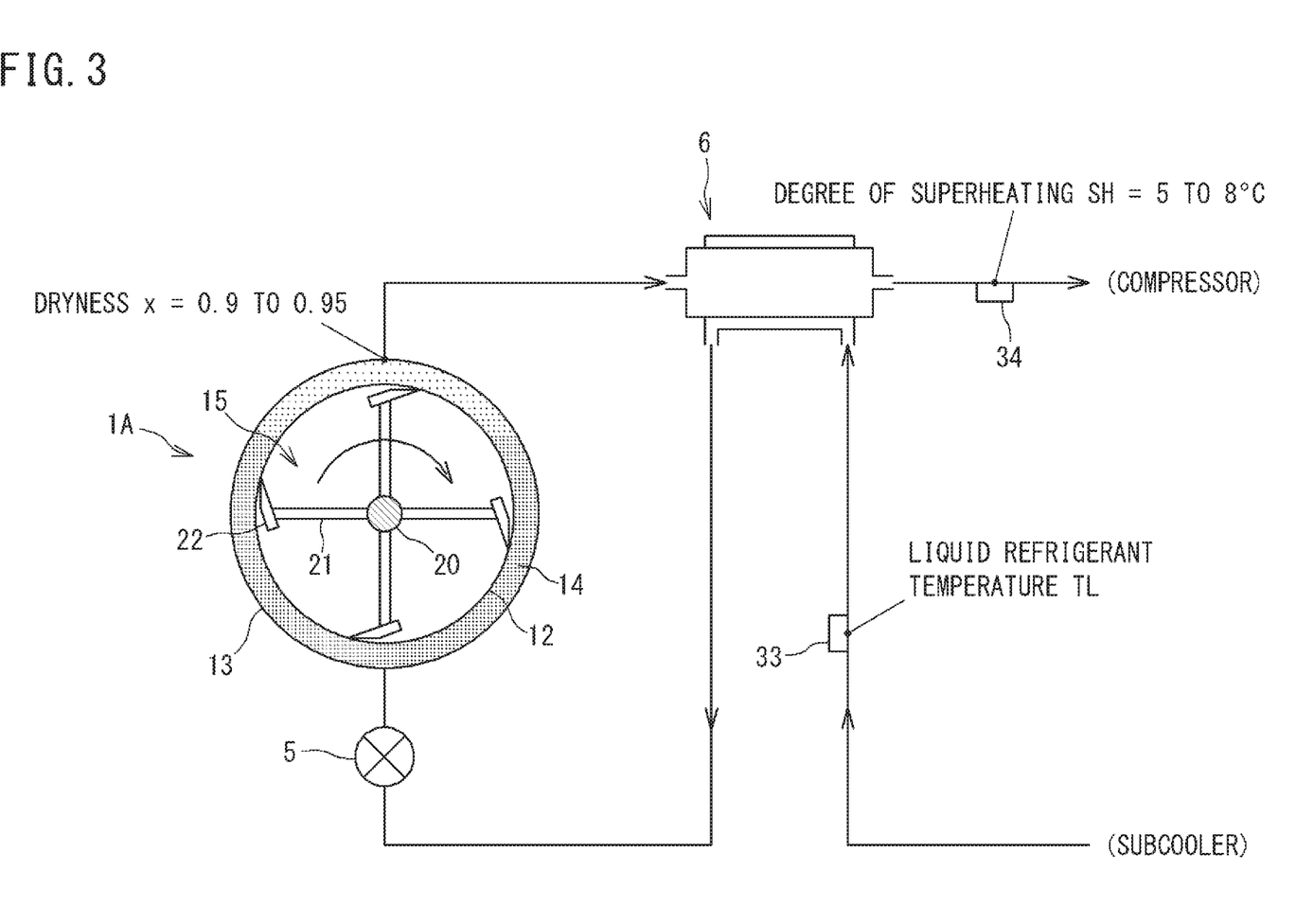
FIG. 3 is an explanatory schematic diagram showing an ice making machine and a refrigerant pipe connected to the ice making machine.

FIG. 3 is an explanatory diagram schematically showing the ice making machine and the refrigerant pipe connected to the ice making machine.

The blade mechanism 15 includes a shaft 20, support bars 21, and blades 22. One end of the shaft 20 in the axial direction extends outward from a flange 23 provided at the one end of the inner pipe 12 in the axial direction and is connected to a motor, i.e., the drive unit 24. The support bars 21 are erected at predetermined intervals on the peripheral surface of the shaft 20, and the blades 22 are attached to the tips of the support bars 21. Each of the blades 22 includes, for example, a metal strip member. A side edge of the blade 22 on the front side in the rotation direction has a sharp tapered shape.

The evaporator 1A of the double-pipe ice making machine 1 is configured by a flooded evaporator. The flooded evaporator 1A is configured to enhance the efficiency of heat exchange between the refrigerant and seawater, with a major part of the annular space 14 between the outer pipe 13 and the inner pipe 12 filled with liquid refrigerant. Since the major part of the annular space 14 is filled with liquid refrigerant, refrigeration oil inside the flooded evaporator 1A can be easily discharged from the flooded evaporator 1A. The discharged refrigeration oil is then returned to the compressor 2, thereby suppressing insufficient lubrication of the compressor 2 and improving the reliability of the system.

(Basic Operation of Ice Making System)

To perform a normal ice making operation, the four-way switching valve 4 is maintained in a state shown by the solid lines in FIG. 1. High-temperature, high-pressure gas refrigerant discharged from the compressor 2 flows through the four-way switching valve 4 into the heat source-side heat exchanger 3 functioning as a condenser, exchanges heat with air through the operation of the fan 10, and is condensed and liquefied. The liquefied refrigerant flows into the subcooling device 11 through the receiver 7. The refrigerant is subcooled in the subcooling device 11.

The refrigerant that has flowed out of the subcooling device 11 passes through the superheater 6 as superheating refrigerant, and flows into the utilization-side expansion valve 5. At this time, the subcooled liquid refrigerant flows into the utilization-side expansion valve 5. This makes it possible to suppress the occurrence of hunting due to flushing of the refrigerant caused by the gas-liquid two-phase refrigerant flowing into the utilization-side expansion valve 5, and to suppress a decrease in circulation amount of the refrigerant. The refrigerant is also subcooled by passing through the superheater 6.

The refrigerant is decompressed to have a predetermined low pressure by the utilization-side expansion valve 5, and supplied through the refrigerant inlet 18 of the ice making machine 1 into the annular space 14 between the inner pipe 12 and the outer pipe 13 that constitute the ice making machine 1.

The refrigerant supplied into the annular space 14 exchanges heat with seawater that has flowed into the inner pipe 12 through the pump 9, and evaporates. The pump 9 sucks seawater from the seawater tank 8 and pumps the seawater into a seawater flow path of the ice making machine 1. The ice slurry generated in the seawater flow path is returned to the seawater tank 8 together with the seawater by a pump pressure.

The refrigerant that has evaporated in the ice making machine 1 is sucked into the compressor 2 through the superheater 6. The superheater 6 superheats the refrigerant discharged from the ice making machine 1. This is because, if the wet refrigerant containing liquid enters the compressor 2 without being completely evaporated in the ice making machine 1, the compressor 2 may malfunction due to a sudden increase in pressure inside the cylinder (liquid compression) and a decrease in viscosity of the refrigeration oil.

If the flow of seawater is interrupted inside the inner pipe 12 of the ice making machine 1 and ice accumulates inside the inner pipe 12 (ice accumulation), the ice making machine 1 cannot be operated. In this case, a defrost operation (cleaning operation) is performed to melt the ice inside the inner pipe 12. In the defrost operation, the four-way switching valve 4 is switched to a state shown by the broken lines in FIG. 1. The high-temperature, high-pressure gas refrigerant discharged from the compressor 2 flows into the annular space 14 between the inner pipe 12 and the outer pipe 13 of the flooded evaporator 1A via the four-way switching valve 4 and the superheater 6, exchanges heat with seawater containing ice in the inner pipe 12, and is condensed and liquefied. The liquefied refrigerant flows into the heat source-side expansion valve 27 via the superheater 6, the subcooling device 11, and the receiver 7, is decompressed to have a predetermined low pressure by the heat source-side expansion valve 27, and flows into the heat source-side heat exchanger 3 functioning as an evaporator. The refrigerant that has flowed into the heat source-side heat exchanger 3 functioning as an evaporator during the defrost operation exchanges heat with air through the operation of the fan 10, evaporates, and is sucked into the compressor 2.

(Specific Control of Ice Making System)

More specific control of the ice making system A will be described below.

As shown in FIG. 1, the ice making system A includes the control device 50. The control device 50 includes a central processing unit (CPU) and a memory. The memory includes, for example, a RAM and a ROM.

The control device 50 controls the operation of the ice making system A in various ways with the CPU executing a computer program stored in the memory. Specifically, the control device 50 controls the opening degrees of the utilization-side expansion valve 5 and the intermediate expansion valve 11c. The control device 50 also controls the operating frequencies of the compressor 2 and the fan 10. The control device 50 may be provided separately on each of the ice making machine 1 and the heat source-side heat exchanger 3. In this case, for example, the control device on the heat source-side heat exchanger 3 can control the operations of the intermediate expansion valve 11c, the fan 10, and the compressor 2, while the control device on the ice making machine 1 can control the operation of the utilization-side expansion valve 5.

The refrigerant circuit in the ice making system A is provided with a plurality of sensors. As shown in FIG. 1, a suction pressure sensor 31 is provided on the suction side of the compressor 2, and a discharge pressure sensor 32 is provided on the discharge side of the compressor 2. A liquid refrigerant temperature sensor 33 is provided downstream of the subcooling device 11. A gas refrigerant temperature sensor 34 is provided downstream of the superheater 6 after passing through the ice making machine 1. Detection signals of these sensors are input to the control device 50 and used for various types of control.

Figure 4:
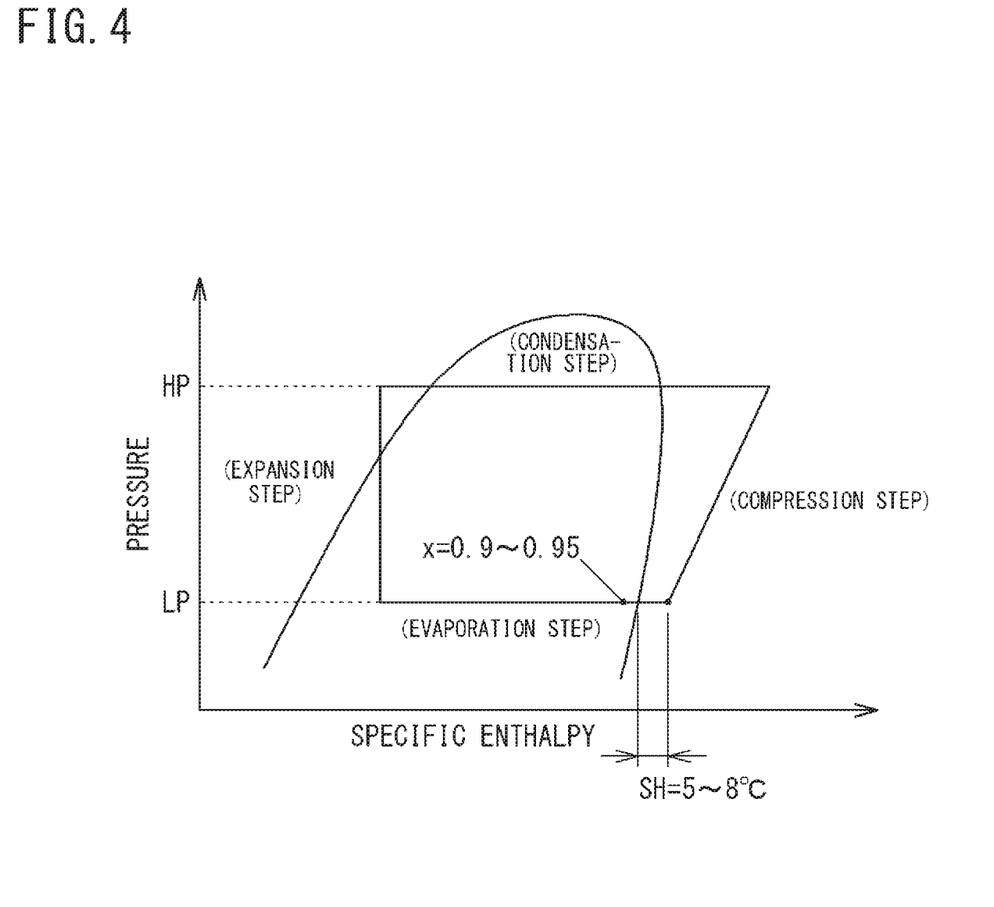
FIG. 4 is a pressure-enthalpy chart showing a refrigeration cycle.

FIG. 4 is a pressure-enthalpy chart showing a refrigeration cycle.

In order to maintain a high liquid level of the liquid refrigerant in the annular space 14 of the flooded evaporator 1A, the ice making system A according to one or more embodiments is configured such that dryness x of the refrigerant discharged from the refrigerant outlet 19 of the flooded evaporator 1A falls within a predetermined target range of less than 1, for example, x=0.9 to 0.95. The superheater 6 imparts a degree of superheating SH to the refrigerant discharged from the refrigerant outlet 19 of the flooded evaporator 1A, whereby the flow of the liquid refrigerant into the compressor 2 is suppressed. The superheater 6 is capable of imparting the degree of superheating SH of 5 to 8 degrees to refrigerant having the dryness x of 0.9 to 0.95.

The control device 50 according to one or more embodiments performs the following processes in order to keep the dryness of the refrigerant discharged from the flooded evaporator 1A within a predetermined range.

(A) Adjusting degree of superheating through control of utilization-side expansion valve (B) Adjusting target value of degree of superheating (C) Maintaining temperature of superheating refrigerant through control of capacity of subcooling device (D) Maintaining circulation amount of refrigerant in expansion valve through control of capacity of subcooling device and fan Each of the processes will be described in detail below.

(A: Adjusting Degree of Superheating Through Control of Expansion Valve)

The control device 50 according to one or more embodiments calculates the saturation temperature (evaporation temperature) of the refrigerant based on the suction pressure detected by the suction pressure sensor 31. The control device 50 also calculates the degree of superheating SH of the refrigerant based on a difference between the temperature detected by the gas refrigerant temperature sensor 34 and the saturation temperature. The control device 50 compares the degree of superheating SH with a predetermined target value (target degree of superheating), and controls the opening degree of the utilization-side expansion valve 5 such that the degree of superheating SH and the target value coincide. Specifically, the control device 50 controls the opening degree of the utilization-side expansion valve 5 such that the superheater 6 imparts, to the refrigerant discharged from the flooded evaporator 1A, the degree of superheating SH with which the dryness x of the refrigerant can be kept within a predetermined range (for example, x=0.9 to 0.95).

This makes it possible to maintain a constant high liquid level of the liquid refrigerant in the annular space 14 of the flooded evaporator 1A, and to enhance the efficiency of heat exchange between the liquid refrigerant and seawater. The refrigeration oil that has flowed into the flooded evaporator 1A is discharged from the flooded evaporator 1A together with the wet refrigerant, and easily returned to the compressor 2. This can suppress insufficient lubrication of the compressor 2.

(B: Adjusting Target Value of Degree of Superheating)

The control of the utilization-side expansion valve 5 described in the above (A) can be exercised based on a constant target degree of superheating if the capacity of the superheater 6 is constant. In a case where the capacity of the superheater 6 fluctuates, however, the dryness x of the refrigerant discharged from the flooded evaporator 1A may not fall within the predetermined range even with a constant degree of superheating SH imparted to the refrigerant. Therefore, in the case where the capacity of the superheater 6 fluctuates, the control device 50 according to one or more embodiments adjusts the target degree of superheating SH accordingly.

The superheater 6 according to one or more embodiments imparts the degree of superheating SH to the refrigerant discharged from the flooded evaporator 1A using the liquid refrigerant (hereinafter, also referred to as "superheating refrigerant") flowing from the heat source-side heat exchanger (condenser) 3 through the subcooling device 11. When the temperature of the superheating refrigerant changes, therefore, the capacity of the superheater 6 also changes. The control device 50 measures the temperature of the superheating refrigerant of the superheater 6 with the liquid refrigerant temperature sensor 33, and determines the target degree of superheating based on the measured temperature.

For example, in a case where the temperature of the superheating refrigerant of the superheater 6 falls below a predetermined value, the capacity of the superheater 6 decreases; therefore, the control device 50 sets the target degree of superheating lower. Conversely, in a case where the temperature of the superheating refrigerant of the superheater 6 rises above the predetermined value, the capacity of the superheater 6 increases; therefore, the control device 50 sets the target degree of superheating higher. The control device 50 then controls the opening degree of the utilization-side expansion valve 5 based on the newly set target degree of superheating. This makes it possible to keep the dryness x of the refrigerant discharged from the flooded evaporator 1A within a predetermined range, and to maintain a substantially constant liquid level of the liquid refrigerant inside the flooded evaporator 1A.

(C: Maintaining Temperature of Superheating Refrigerant through Control of Capacity of Subcooling Device)

The control device 50 according to one or more embodiments can exercise control for maintaining the temperature of the superheating refrigerant of the superheater 6 constant, instead of the control described in the above (B). This makes it possible to suppress the fluctuation of the capacity of the superheater 6 and to control the opening degree of the utilization-side expansion valve 5 without changing the target degree of superheating.

The liquid refrigerant temperature sensor 33 measures the temperature of the superheating refrigerant of the superheater 6, that is, a temperature TL of the refrigerant flowing out of the subcooling device 11. The control device 50 controls the capacity of the subcooling device 11 such that the temperature TL of the refrigerant becomes a predetermined target temperature. Specifically, the control device 50 adjusts the circulation amount of the refrigerant flowing through the injection pipe 11b by controlling the intermediate expansion valve 11c provided in the injection pipe 11b of the subcooling device 11.

For example, in a case where the temperature of the superheating refrigerant of the superheater 6 rises above the target temperature, the intermediate expansion valve 11c is operated in the opening direction to thereby further increase the circulation amount of the refrigerant flowing through the injection pipe 11b. Conversely, in a case where the temperature of the superheating refrigerant of the superheater 6 falls below the target temperature, the intermediate expansion valve 11c is operated in the closing direction to thereby decrease the circulation amount of the refrigerant flowing through the injection pipe 11b. This makes it possible to maintain the temperature of the superheating refrigerant of the superheater 6 substantially constant, and to suppress the fluctuation of the capacity of the superheater 6. The control device 50 controls the opening degree of the utilization-side expansion valve 5 based on a constant target degree of superheating, making it possible to keep the dryness x of the refrigerant discharged from the flooded evaporator 1A within a predetermined range and to maintain a substantially constant liquid level of the liquid refrigerant inside the flooded evaporator 1A.

(D: Maintaining Circulation Amount of Refrigerant in Expansion Valve through Control of Capacity of Subcooling Device and Fan)

A circulation amount G of refrigerant in the utilization-side expansion valve 5 is defined by the following formula (1):

[Formula 1]

$$G \propto \text{opening degree of expansion valve} \times \sqrt{((HP-LP) \times \rho L)} \quad (1)$$

where HP represents the discharge pressure (high pressure), and LP represents the suction pressure (low pressure). $\rho L$ represents the liquid density of refrigerant before passing through the expansion valve, and is a physical property value determined based on the refrigerant temperature TL and the discharge pressure HP.

The liquid level of the refrigerant inside the flooded evaporator 1A fluctuates in accordance with the circulation amount of the refrigerant passing through the utilization-side expansion valve 5, and thus becomes unstable. Therefore, if the degree of superheating SH is adjusted through the control of the opening degree of the utilization-side expansion valve 5 in the above (A), the liquid level inside the ice making machine 1 may fluctuate. Therefore, the control of the opening degree of the utilization-side expansion valve 5 may be minimized, and the circulation amount of the refrigerant passing through the utilization-side expansion valve 5 may be kept as constant as possible.

Based on the above formula (1), in order to keep the circulation amount G of refrigerant in the utilization-side expansion valve 5 constant, the difference between the discharge pressure HP and the suction pressure LP (HP−LP) and the refrigerant density $\rho L$ just need to be kept constant, with the opening degree of the utilization-side expansion valve 5 kept constant. Since the refrigerant density $\rho L$ is determined based on the refrigerant temperature TL and the discharge pressure HP, the control device 50 sets a target value of the refrigerant temperature TL at which the degree of superheating SH imparted by the superheater 6 becomes a predetermined value. The control device 50 also sets a target value of the discharge pressure HP in accordance with the refrigerant temperature TL and the differential pressure (HP−LP).

The control device 50 controls the capacity of the subcooling device 11 such that the refrigerant temperature TL becomes the target temperature. As described above, the control device 50 controls the capacity of the subcooling device 11 by controlling the intermediate expansion valve 11c provided in the injection pipe 11b and adjusting the circulation amount of the refrigerant flowing through the injection pipe 11b.

The control device 50 also adjusts the discharge pressure HP to a target value by controlling the number of rotations of the fan 10. In other words, the control device 50 lowers the discharge pressure HP by increasing the number of rotations of the fan 10, and raises the discharge pressure HP by decreasing the number of rotations of the fan 10. Through this control, the differential pressure (HP−LP) is adjusted to a predetermined value.

The above control of the capacity of the subcooling device 11 and the fan 10 makes it possible to keep the circulation amount of the refrigerant passing through the utilization-side expansion valve 5 substantially constant, and to reduce the fluctuation of the liquid level of the refrigerant inside the flooded evaporator 1A of the ice making machine 1 and thus keep a constant, stable liquid level.

In a case where there is no fluctuation in one of the differential pressure (HP−LP) and the refrigerant temperature TL, only one of the discharge pressure HP and the refrigerant temperature TL may be adjusted.

In a case where the capacity of the subcooling device 11 cannot be controlled with the intermediate expansion valve 11c, for example, in a case where the opening degree of the intermediate expansion valve 11c has reached the upper limit, the refrigerant temperature TL can be controlled through control of the number of rotations of the fan 10. For example, it is possible to lower the refrigerant temperature TL by increasing the number of rotations of the fan 10, and to raise the refrigerant temperature TL by decreasing the number of rotations of the fan 10.

Figure 5:
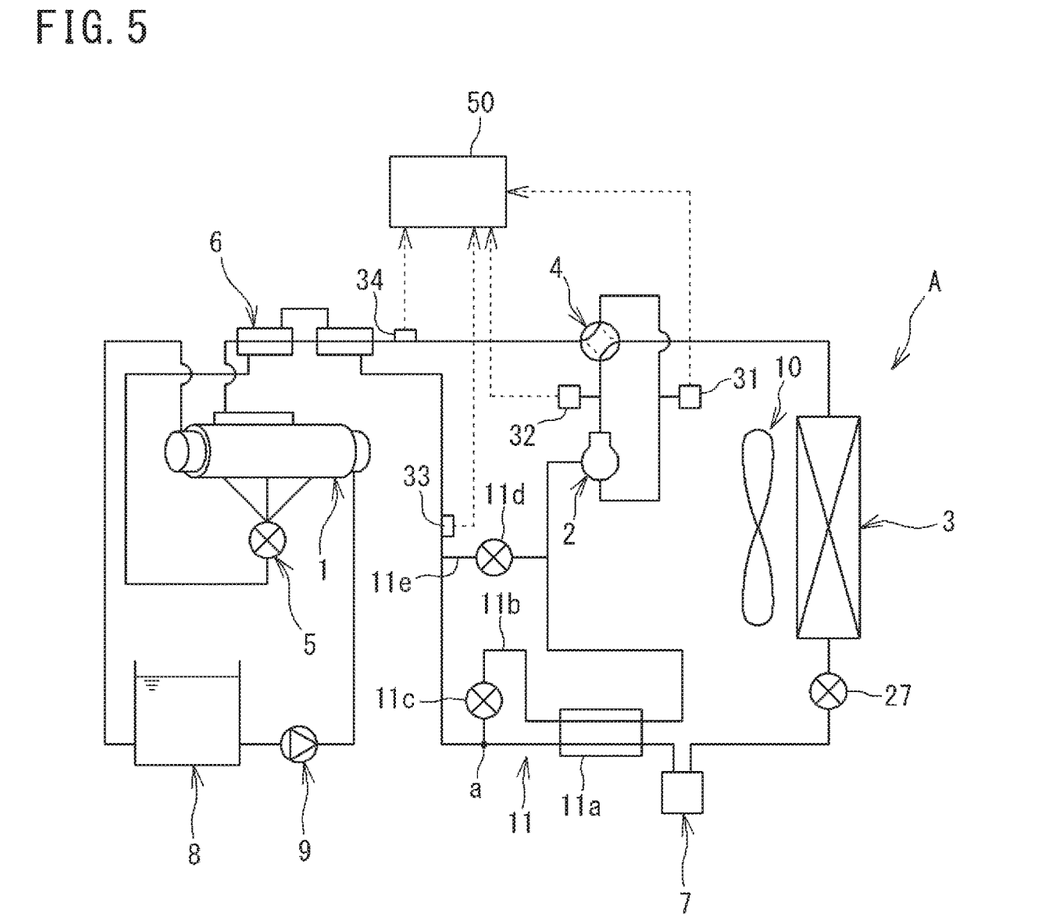
FIG. 5 is a schematic configuration diagram of an ice making system according to one or more embodiments.

FIG. 5 is a schematic configuration diagram of an ice making system according to one or more embodiments.

In the ice making system A according to one or more embodiments, a subcooling device 11 includes a second injection pipe 11e and a second intermediate expansion valve (third expansion valve) 11d, as well as a subcooler 11a, an injection pipe 11b, and an intermediate expansion valve (second expansion valve) 11c. In one or more embodiments, the injection pipe 11b is referred to as a first injection pipe, and the intermediate expansion valve 11c is referred to as a first intermediate expansion valve.

One end of the second injection pipe 11e is connected to the first injection pipe 11b between the subcooler 11a and a compressor 2. The other end of the second injection pipe 11e is connected to a refrigerant pipe between a superheater 6 and a position a where the first injection pipe 11b branches from a refrigerant pipe downstream of the subcooler 11a.

The second intermediate expansion valve 11d is provided in the second injection pipe 11e. For example, a pulse motor-driven electronic expansion valve is used as the second intermediate expansion valve 11d. The second intermediate expansion valve 11d adjusts the flow rate of refrigerant flowing through the second injection pipe 11e, decompresses the refrigerant, and lowers the temperature of the refrigerant. The opening degree of the second intermediate expansion valve 11d is controlled by a control device 50.

As described above, in the ice making system A according to one or more embodiments, the control device 50 adjusts the temperature of the superheating refrigerant in the superheater 6 by controlling the opening degree of the first intermediate expansion valve 11c, in order to perform the process (C) or (D). Meanwhile, in the compressor 2, the discharge temperature of the refrigerant is adjusted using the refrigerant introduced from the first injection pipe 11b. For example, in a case where the discharge temperature of the refrigerant in the compressor 2 is high, the opening degree of the first intermediate expansion valve 11c is increased to increase the flow rate of the refrigerant introduced from the first injection pipe 11b, thereby lowering the discharge temperature. However, if such adjustment of the discharge temperature of the compressor 2 is prioritized over the adjustment of the temperature of the superheating refrigerant, it may be difficult to adjust the temperature of the superheating refrigerant.

In one or more embodiments, the subcooling device 11 includes the second injection pipe 11e and the second intermediate expansion valve 11d, and the control device 50 adjusts the flow rate of the refrigerant to be introduced into the compressor 2 by controlling the opening degree of the second intermediate expansion valve 11d. This makes it possible to appropriately adjust the temperature of the superheating refrigerant flowing into the superheater 6 only by controlling the opening degree of the first intermediate expansion valve 11c.

Other Modifications

The present disclosure is not limited to the embodiments described above, but various modifications can be made within the scope of the claims.

For example, in the above embodiments, the double-pipe flooded evaporator is used in the ice making machine. Alternatively, for example, a plurality of inner pipes through which a medium to be cooled flows may be provided inside an outer pipe through which refrigerant flows. In the above embodiments, seawater is used as the medium to be cooled, but another solution such as ethylene glycol may also be used.

There is provided one ice making machine in the above embodiments, but a plurality of ice making machines may be connected in series. There is provided one compressor in the above embodiments, but a plurality of compressors may be connected in parallel.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: ICE MAKING MACHINE
1A: FLOODED EVAPORATOR
2: COMPRESSOR
3: HEAT SOURCE-SIDE HEAT EXCHANGER (CONDENSER)
5: UTILIZATION-SIDE EXPANSION VALVE (FIRST EXPANSION VALVE)
6: SUPERHEATER
11: SUBCOOLING DEVICE
11a: SUBCOOLER
11b: INJECTION PIPE (BRANCH PIPE)
11c: INTERMEDIATE EXPANSION VALVE (SECOND EXPANSION VALVE)
50: CONTROL DEVICE
A: ICE MAKING SYSTEM
x: DRYNESS
SH: DEGREE OF SUPERHEATING

The invention claimed is:

1. An ice making system comprising:
a refrigerant circuit that performs a vapor compression refrigeration cycle and that comprises:
a compressor;
a condenser that condenses refrigerant discharged from the compressor;
a first expansion valve that decompresses the refrigerant from the condenser;
a flooded evaporator that evaporates and discharges the refrigerant decompressed by the first expansion valve; and
a superheater that superheats the refrigerant discharged from the flooded evaporator;
a circulation circuit that circulates a medium that is cooled by the flooded evaporator;
a controller that controls the first expansion valve such that the superheater superheats the refrigerant discharged from the flooded evaporator to a superheating temperature, wherein dryness of the refrigerant discharged from the flooded evaporator is within a predetermined range of less than 1;

a refrigerant cooler that subcools the refrigerant that has flowed out of the condenser; and a temperature sensor that measures a temperature of the refrigerant subcooled by the refrigerant cooler and flowing out from the refrigerant cooler toward the flooded evaporator via the superheater, wherein the superheater superheats the refrigerant discharged from the flooded evaporator using the refrigerant subcooled by the refrigerant cooler, and the controller controls a capacity of the refrigerant cooler such that the temperature is constant.

2. The ice making system according to claim 1, wherein the predetermined range is between 0.9 and 0.95.

3. The ice making system according to claim 1, wherein the refrigerant cooler comprises:

a subcooler into which the refrigerant flows from the condenser;

a branch pipe that branches from a refrigerant path that extends from the subcooler to the first expansion valve; and a second expansion valve that decompresses the refrigerant flowing through the branch pipe, the refrigerant cooler subcools the refrigerant flowing from the condenser into the subcooler using the refrigerant decompressed by the second expansion valve, and the controller controls the second expansion valve such that a temperature of the refrigerant that has flowed out of the subcooler reaches a constant target value.

4. The ice making system according to claim 1, further comprising:

a fan that cools the condenser with air, wherein a number of rotations of the fan is controlled by the controller, wherein the controller controls at least one of the capacity of the refrigerant cooler and a capacity of the fan such that a circulation amount of the refrigerant passing through the first expansion valve is constant.

5. The ice making system according to claim 1, wherein the medium is seawater.

* * * * *